(12) United States Patent
Wang et al.

(10) Patent No.: US 6,654,995 B1
(45) Date of Patent: Dec. 2, 2003

(54) METHOD FOR JOINING TUBULAR MEMBERS

(75) Inventors: Pei-Chung Wang, Troy, MI (US); Michael Gerard Poss, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/688,249

(22) Filed: Oct. 16, 2000

(51) Int. Cl.[7] .............................................. B23P 17/00
(52) U.S. Cl. ........................ 29/421.1; 29/455.1; 29/505; 29/510; 29/521; 219/93
(58) Field of Search ............................ 29/455.1, 469.5, 29/505, 506, 508, 510, 511, 512, 515, 516, 520, 521, 421.1; 219/93, 59.1; 72/121, 105

(56) References Cited

U.S. PATENT DOCUMENTS

| | | | | |
|---|---|---|---|---|
| 1,020,991 A | * | 3/1912 | Lachman | 219/93 |
| 1,703,037 A | * | 2/1929 | Heck | 228/136 |
| 1,822,197 A | * | 9/1931 | Bowlus | 219/93 |
| 1,901,176 A | * | 3/1933 | Lawson | 219/93 |
| 1,977,567 A | * | 10/1934 | Eksergian | 219/93 |
| 2,757,028 A | * | 7/1956 | Latzen | 403/203 |
| 3,114,030 A | * | 12/1963 | Ruskin | 219/93 |
| 3,118,049 A | * | 1/1964 | Gros et al. | 219/93 |
| 3,125,493 A | * | 3/1964 | D'Amore | 376/420 |
| 3,162,940 A | * | 12/1964 | Kuhn | 29/421.1 |
| 3,208,136 A | * | 9/1965 | Joslin | 29/458 |
| 3,210,102 A | * | 10/1965 | Joslin | 285/374 |
| 3,467,414 A | * | 9/1969 | Downing | 285/382.2 |
| 3,473,359 A | * | 10/1969 | Joslin | 72/121 |
| 3,867,824 A | * | 2/1975 | Takagi et al. | 72/118 |
| 3,885,821 A | * | 5/1975 | Philibert | 285/149.1 |
| 3,909,045 A | * | 9/1975 | Meagher | 285/22 |
| 3,916,504 A | * | 11/1975 | Thorne et al. | 29/455 |
| 4,091,648 A | * | 5/1978 | McCaslin | 72/121 |
| 4,257,155 A | * | 3/1981 | Hunter | 29/511 |
| 4,269,438 A | * | 5/1981 | Ridenour | 285/382.2 |
| 4,396,213 A | * | 8/1983 | Hawkins | 285/287 |
| 4,442,586 A | * | 4/1984 | Ridenour | 29/511 |
| 4,495,397 A | * | 1/1985 | Opprecht et al. | 219/93 |
| 4,497,428 A | | 2/1985 | Baumann | 228/175 |
| 4,504,714 A | * | 3/1985 | Katzenstein | 219/9.5 |
| 4,513,188 A | * | 4/1985 | Katzenstein | 219/9.5 |
| 4,547,641 A | * | 10/1985 | Nebergall et al. | 219/10.41 |
| 4,677,271 A | * | 6/1987 | Opprecht | 219/93 |
| 4,804,819 A | * | 2/1989 | Farrow | 219/91.2 |
| 4,850,621 A | * | 7/1989 | Umehara | 285/322 |
| 4,902,048 A | * | 2/1990 | Washizu | 285/319 |
| 4,902,049 A | * | 2/1990 | Umehara | 285/347 |
| 5,073,693 A | * | 12/1991 | Kikuchi et al. | 219/93 |
| 5,168,142 A | * | 12/1992 | Gartner et al. | 219/121.64 |
| 5,283,413 A | * | 2/1994 | Favre-Tissot | 219/93 |
| 5,333,775 A | * | 8/1994 | Bruggemann et al. | 228/157 |
| 5,544,406 A | * | 8/1996 | Ridenour et al. | 29/520 |
| 5,720,092 A | | 2/1998 | Ni et al. | 29/421.1 |
| 5,813,264 A | * | 9/1998 | Steingroever | 72/56 |
| 5,890,287 A | * | 4/1999 | Fukaya | 29/890.14 |
| 5,937,496 A | * | 8/1999 | Benoit et al. | 29/419.2 |

(List continued on next page.)

FOREIGN PATENT DOCUMENTS

EP 134566 * 3/1985 .......... F16L/13/14

*Primary Examiner*—Gregory Vidovich
*Assistant Examiner*—Essama Omgba
(74) *Attorney, Agent, or Firm*—Kathryn A. Marra

(57) ABSTRACT

A method is disclosed for inserting an end of a first tubular member into a complementary end of a second tubular member and attaching (e.g., welding) the adjacent surfaces of the inserted ends in a tight peripheral bond. In the method, a substantially continuous protrusion is formed in either the first or second member. Thereafter, the first and second tubular members are placed relative to each other such that a current may be passed through the protrusion and a seal may be formed, thereby joining the members.

18 Claims, 1 Drawing Sheet

U.S. PATENT DOCUMENTS

| | | | | |
|---|---|---|---|---|
| 6,010,155 A | * | 1/2000 | Rinehart | 280/781 |
| 6,104,012 A | * | 8/2000 | Durand | 219/617 |
| 6,244,088 B1 | * | 6/2001 | Compton | 72/105 |
| 6,361,244 B1 | * | 3/2002 | Ni et al. | 403/393 |
| 6,421,913 B1 | * | 7/2002 | Bonnah, II et al. | 29/888.46 |
| 6,427,309 B1 | * | 8/2002 | Viegener | 29/450 |
| 6,460,250 B1 | * | 10/2002 | Amborn et al. | 29/897.2 |
| 6,474,534 B2 | * | 11/2002 | Gabbianelli et al. | 228/131 |

* cited by examiner

METHOD FOR JOINING TUBULAR MEMBERS

TECHNICAL FIELD

The present invention relates to a method for making a sound circumferential weld at the overlapped joining region of a metal tube-receiving member with an inserted tube. In a particular application, the present invention relates to a practical method for forming such a hydrostatic pressure-tight connection in an assembled tubular structure intended to undergo subsequent hydroforming.

BACKGROUND OF THE INVENTION

There are a variety of manufacturing or assembly applications in which the end of one metal tube is inserted into the complementary cylindrical recess of another member for permanent attachment to it. In many applications the receiving member is a second tube with an end sized to receive the end of the first tube. In other applications, for example, the second member is a structural member, such as a nodal piece of a tubular frame structure with an opening adapted to be inserted into, or to receive, the end of one or more such tubes.

Frame structures comprising an assembly of tubes and tube-end attachment members have been used in bicycle frames and small airplane bodies and the like. Such structures are also being considered for car bodies as disclosed in U.S. Pat. No. 5,720,092, assigned to the assignee of this invention. In the automotive application, it may be the practice to assemble a group of round metal tubes with each other and tube-end receiving node pieces into an initial frame assembly. The initial assembly is placed between matched dies, filled with water and subjected to sufficient hydrostatic pressure to expand or bend or otherwise reshape the initial tubular assembly into an integral frame member of complex three-dimensional shape. In this hydroforming procedure, it is necessary to have high pressure water-tight connections between tubes or between tubes and mating structural members. Heretofore there has not been a practical and reliable method of obtaining such connections.

SUMMARY OF THE INVENTION

This invention provides a method of providing a sound circumferential weld between the end of a tube and a second member adapted to receive either the inside or outside dimension of the tube end in suitably tight engagement. The pieces to be welded may be two tubes with inter-fitting ends or a tube and a tube-end receiving member. The tube-end receiving member may be sized to receive the outside diameter of the tube, or the tube receiving member may itself have a tube portion that fits within the inside diameter of the tube. While the following description is largely expressed in terms of two tubes for simplicity, the subject method is applicable to both of the above-described applications. As stated, a principal purpose and application of the invention is in assembling tubular frame structures for subsequent hydroforming.

In many, but not necessarily all, applications, the starting workpieces will be round tubes with the outside diameter of the end of the first tube closely fitting the inside diameter of the end portion of the second tube. Of course, the end portions of such tubes can be of any suitable cross section so long as they are complementary, or geometrically similar, for insertion of one into the other. For example, the tubes could be square, rectangular, oval, or the like. Again, for simplicity, in the following description the tubes will often be referred to as round, but the applicability of this process is to tubes of complementary end portions in general.

According to a first embodiment of the invention, a first tubular member is provided having an end with a predetermined, desired outer diameter (sometimes OD herein), or other defining dimension if the tube is not round, and a second tubular member is provided having an internal diameter (sometimes ID herein) slightly larger (for example, about two millimeters larger) than the OD of the first tube. A continuous, circumferential, inwardly directed, shallow protrusion is formed in the end region of the second tube. Preferably, the inside dimension of the annular protrusion is such that it will tightly receive the OD surface of the first tube. Thus, where there is about two millimeters difference in the diameters of the complementary tubes, the protrusion extends radially about one millimeter in from the ID of the outer tube. The end of the first tube is inserted into the end of the second tube through the surrounding protrusion. Initially, the protrusion serves to locate and grip the inserted tube. Then a suitable welding current is passed through the overlapping portions of the assembled tubes and through the projection to form a full circumferential bond between the tubes.

In a preferred embodiment, radial pressure is concurrently applied to the outer tube to press its protrusion against the inner tube and promote a full circumferential welded bond between the facing surfaces of the mated tubes. Such pressure may, for example, be applied mechanically with a tool(s) of suitable circumferential shape, or by non-contact means as with a circumferential electromagnetic forming tool.

According to a second embodiment of the present invention, the protrusion is formed on the OD surface of the inner tube of the assembly. The annular protrusion extends outwardly for full circumferential engagement with the inner ID surface of the outer tube. After the end of the outer tube has been pushed over the protrusion of the inner tube, a suitable welding current is passed through the joined pieces and projection to accomplish a full circumferential weld at the region of the projection.

Complementary projections could be formed on both tubes so that, for example, when the tubes are inserted for welding, the projections lie close and parallel to ultimately provide a wider welded connection between the tubes. As stated, a principle application for the subject method is to form a tubular assembly for subsequent hydroforming.

Advantageously, relatively few tools or parts are required to quickly form a high integrity joint. These and other aspects and advantages of the present invention will become apparent upon reading the following detailed description in combination with the accompanying drawings.

DESCRIPTION OF THE PREFERRED EMBODIMENT

In the most general form, the present invention provides a method for joining or attaching a first tubular member to a second tubular member.

Figure 1:
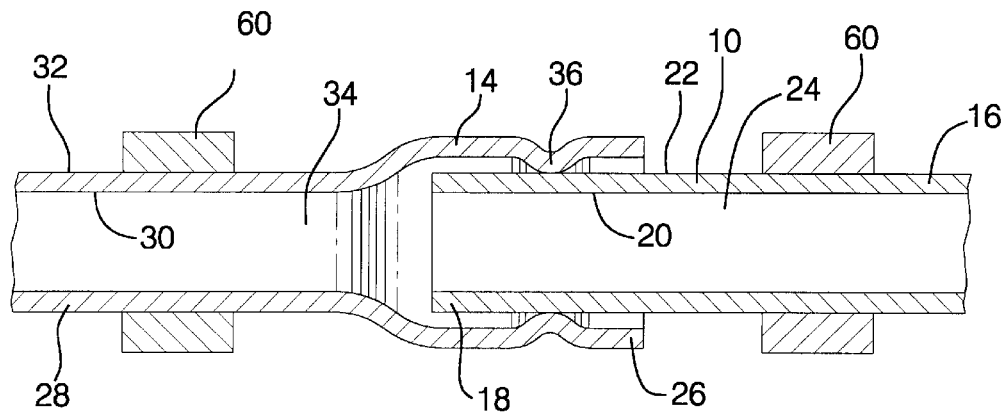
FIG. 1 illustrates a sectional side view of a first tubular member being joined to a second tubular member according to an aspect of the present invention.

In a non-limiting embodiment of the invention the method includes providing a first tubular member, a second tubular member having a portion for matingly engaging the first tubular member, and a protrusion projecting outward of the wall of the second member, inward of the wall of the first member or both types of projections. Referring to FIG. 1, there is illustrated a non-limiting embodiment of a first tubular member 10 and a second tubular member 14 being attached or joined to each other.

The first tubular member 10 is generally elongated with a first end 16 and a second end 18. The first member 10 may include an inner surface 20 (if hollow as shown) and an outer surface 22. A hollow portion or passageway 24 extends along the length of the member 10 between the first end 16 and the second end 18. In one embodiment, the first member 10 is generally curved or cylindrical around the hollow portion 24 such that a cross-section of the member 10 taken perpendicular to the length of the member 10 would appear substantially circular or elliptical.

In alternative embodiments, the first member 10 may be other than circular or elliptical. For example, the first member may be generally square, triangular or some other polygon or combination of planar and curved surfaces about its periphery. The cross-sectional shape may also vary along the length of the first member 10.

In the embodiment shown in FIG. 1, the second tubular member 14 is also elongated and extends between a first end 26 and a second end 28. The second member 14 further includes an inner surface 30 and an outer surface 32. A hollow portion or passageway 34 extends at least partially along the length of the member 14 between the first end 26 and the second end 28. In the embodiment shown, the second member 14 is generally circular or cylindrical around the hollow portion 34 such that a cross-section of the member 10 taken perpendicular to the length of the member 14 would appear substantially circular. Also in the embodiment shown, the first end 26 of the second member 14 has a greater diameter than the second end 18 of the first member 10 such that the first end 26 of the second member 14 can receive the second end 18 of the first member 10 within the hollow portion 34 of the second member 14.

In the embodiment shown, the second member 14 includes a protrusion 36 that extends substantially continuously about the hollow portion 34 or periphery of the second member 14. Though other sectional configurations are possible including flat or angular surfaces, the protrusion 36 is generally curved or arcuate (e.g., as a "U") in cross-section and extends radially inward toward the hollow portion 34.

In further alternative embodiments, the first tubular member 10 may have an enlarged portion for receiving the second tubular member 14 and the second member 14 may be substantially uniform along its length. The protrusion 36 may be formed in either the first or the second members 10, 14 and may extend radially inward or outward relative to the hollow portions or relative to the rest of the members 10, 14. Particularly in FIG. 5, there is shown an outwardly extending radial protrusion 100 from the outer surface 102 of the first tubular member 10.

The first and second tubular members may be formed from a variety of fusible materials. Such materials include, but are not limited to, steel, aluminum, titanium, magnesium, plastic, ceramic, carbon fiber, composites or the like. Furthermore, the first and second members may be formed in any of a variety of manners. For example, the first and second members may be hydroformed, drawn, extruded, forged, roll-formed, cast, molded or otherwise formed by some suitable process, depending upon the material used for the members. In one non-limiting embodiment, for an automotive vehicle frame, the material used for the first and second members is selected from steel, galvanized steel, aluminum, titanium, magnesium, or a mixture thereof, and the first and second members are conventional tubing which may be utilized as part of the frame of an automotive vehicle. Preferably, the tubing is formed with conventional hydroforming techniques. Optionally the material is coated to help resist corrosion (e.g., by a suitable primer). One of skill in the art will recognize that the choice of material used to form the first and second tubular members and the manner in which such members are formed can vary depending upon the application for which the members are to be used.

In one non-limiting embodiment of the invention, the first tubular member 10 and the second tubular member 14 may be parts or components of a space frame for an automotive vehicle. Space frames for automotive vehicles can include tubes with are either joined directly to each other or are joined by connectors or joints. Examples of such space frames and methods for hydroforming such space frames are disclosed in U.S. Pat. No. 5,720,092, which is herein fully incorporated by reference. It shall be recognized that the first member 10 and the second member 14 of the present invention could be tubes, connectors or joints in a vehicle space frame.

In a non-limiting embodiment of the invention, the method of attaching a first member to a second member includes forming a protrusion on the first member, on the second member or both. The protrusion may be formed in a variety of manners. The protrusion may be formed as the member is formed. For example, a tubular member may be hydroformed, cast or otherwise formed with the protrusion in the member. Alternatively, the protrusion may be formed in a pre-formed member. The protrusion is then welded (e.g., by resistance heating it) to the first or second tubular member.

Figure 3:
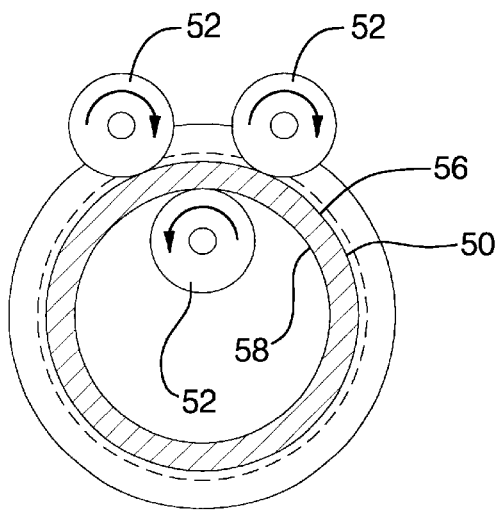
FIG. 3 illustrates a schematic view of a protrusion being formed in a tubular member according to an aspect of the present invention.
Figure 4:
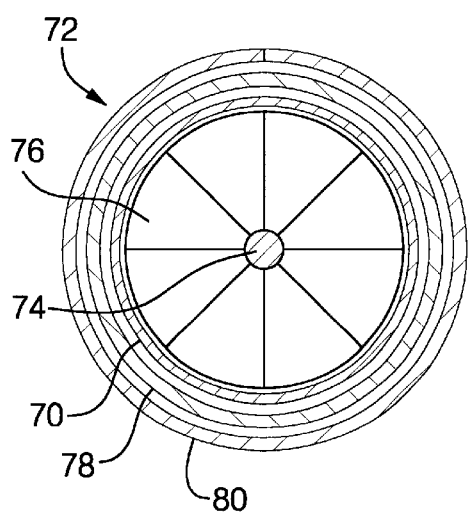
FIG. 4 illustrates another schematic sectional view of a protrusion being formed in a tubular member according to an aspect of the present invention.

Referring to FIGS. 3 and 4, without limitation as to alternative methods for plastically deforming a material to a predetermined configuration, there is disclosed two illustrative alternative methods of forming a protrusion in a tubular member.

FIG. 3 schematically illustrates a roll grooving technique for forming a groove or protrusion in or on a tubular member. In the embodiment shown, there is an elongated tubular member 50 and one or a plurality of (e.g., three) rollers 52, which are attached to a conventional roll grooving machine (not shown). The rollers 52 are spaced along the length of the tubular member 50. A first and second roller 52 contact an outer surface 56 of the tubular member 50 and a third roller 52 contacts an inner surface 58 of the tubular member 50. In the embodiment shown, the first, second and third rollers 52 are spaced on the tubular member 50 such that the third roller 52 is between the first and second roller 52 relative to the elongation of the tubular member 50. In operation, the first and second rollers 52 place a force upon the outer surface 56 of the member 50 and the third roller 52 places a force on the inner surface 58 of the member 50 and the first, second and third rollers 52 move about the circumference of the tubular member 50 thereby gradually forming a groove or protrusion in the tubular member 50 with the third roller 52. It should be recognized that the location of the rotational axis of each roller 52 can be varied as desired to achieve the desired deformation of the workpiece or member.

FIG. 4 schematically illustrates a segmented tooling expansion/reduction technique for forming a groove or protrusion in a tubular member. In the embodiment shown, a protrusion (not shown) is being formed in a tubular member 70 with a suitable expansion/reduction assembly 72. The assembly 72 includes an internal tapered mandrel 74, which is surrounded by a plurality of dies 76. The dies 76 include a convex or a concave bead forming portion (not shown) or some other suitable shaped bead forming portion and the mandrel 74 and the dies 76 are surrounded by or housed within the tubular member 70. The expansion/ reduction assembly 72 also includes external reduction dies 78 and an external tapered ring 80 to reduce or compress the external dies 78. The dies 76, 78 include either a convex or a concave bead forming portion (not shown) and the ring 80 and the dies 78 surround the tubular member 70. In a preferred embodiment, one of the beads on the dies 76, 78 is convex and one is concave and the bead forming portions are generally complementary.

In operation, the internal tapered mandrel 74 is moved in one direction and the external tapered ring 80 is moved in an opposite direction. The mandrel 74 forces or biases the internal dies 76 outward thereby pushing outwardly upon the tubular member 70 while the external ring 80 forces or biases the external dies 78 inward thereby pushing inwardly upon the tubular member 70. As the dies 76, 78 push in opposing directions, the beads on the dies 76, 78 form a protrusion in the tubular member 70 because the bead on one of the dies 76, 78 is convex while the bead on the other one of the dies 76, 78 is concave. For example, the bead on the internal dies 76 may be convex and push a portion of the tubular member 70 into a concave bead of the external dies 78 thereby forming the protrusion.

The person of skill in the art will recognize that the type of protrusion and manner in which the protrusion is formed can be a selective choice based upon the desired characteristics of the attachment of the first member to the second member.

In a non-limiting embodiment of the invention, the method of attaching a first tubular member to a second tubular member also includes placing the protrusion of either the first or the second member such that the protrusion substantially surrounds or is surrounded by the other member.

Again referring to the non-limiting embodiment of FIG. 1, there is illustrated the protrusion 36 on the second tubular member 14 which substantially continuously surrounds the first tubular member 10. In the non-limiting embodiment, the second end 18 of the first member 10 is placed within the first end 26 of the second member 14 such that the protrusion 36 contacts the outer surface 22 of the first member 10. Preferably, the protrusion 36 is in intimate contact with the outer surface 22 of the first member 10 and; therefore substantially contacts the outer surface 22 of the first member 10 in a substantially continuously manner about or surrounding the hollow portion 20 or the first member 10.

In a non-limiting embodiment of the invention, the method of attaching a first tubular member to a second tubular member further includes applying energy (e.g., sufficient for heating to about or above the melting point of the protrusion) to the protrusion effective to join the protrusion, and thus the first and second members.

Referring again to FIG. 1, there is schematically illustrated one non-limiting method of heating the protrusion 36 by resistance heating. In general this involves applying electrical energy to the proposed joint, heating the joint to cause the metal of the protrusion to fuse to both the first and second tubular member and cooling the resulting joint. In one example, electrical connections 60 are selectively attached to, or contacted with either and preferably both of the first and the second members 10, 14. In the embodiment shown, the electrical connections 60 are resistive bands and may be cylindrical or other suitable shape and respectively surround and contact the outer cylindrical surfaces 22, 32 of the first and second members 10, 14. The electrical connections 60 are electrically connected or attached via busses or wires to an electrical power source or supply (not shown).

In non-limiting embodiments, the electrical power source may be chosen from a DC or AC power supply, a conventional transformer, a capacitor or inductor, a pulsing power supply, a capacitive discharge power supply or other power or electrical current supplies. In non-limiting embodiments of the invention, the electrical connections may take a variety of forms as well. For example, the connections could be clamps, blocks, cylinders or the like. The connections could be adjustable or non-adjustable. Furthermore, the connections could be formed from a variety of materials and the materials chosen for the connections may depend upon the material used to form the first and second tubular members. In non-limiting embodiments, the connections are conductive metals (e.g., containing copper, iron, aluminum or the like), and preferably the connections are copper clamps or copper cylinders.

Once the electrical connections 60 have been placed upon the first and second members 10, 14, an electric potential is induced between the connections 60 effective to pass a current through the protrusion 36. Because the protrusion 36 interrupts the natural flow of the current through the tubular members 10, 14, the protrusion 36 provides greater resistance to the flow of the current, which causes the protrusion 36 to heat up. Once the protrusion 36 heats, it tends to melt for initiating a weld and a portion of the first member 10 may melt as well. Once initiated, the weld will grow along the protrusion 36 and, when the current is stopped, the protrusion 36 tends to cool thereby welding or attaching the first and second members 10, 14 together. Because the protrusion 36 substantially surrounds and is in close contact with the outer surface 22 of the first member 10, a substantially water or fluid tight seal or weld joint that is substantially continuous about the protrusion or the first member 10 is formed between the first and second tubular member 10, 14 such that water or fluid could be passed from the hollow portion 24 of the first member 10 to the hollow portion 34 of the second member 14 with an insignificant amount, if any, of water or fluid leaking through the joint.

In alternative embodiments, the electrical connections may be placed in alternative places or positions upon one or more members as long as a current is passed through the protrusion upon one or more of the members. For example, and without limitation, the electrical connections 60 could be respectively contacted with the first and second ends 26, 28 of the second member 14 and a current could still be passed through the protrusion 36. Furthermore, other methods of passing current through the protrusion may also be used according to the present invention. For example the members or the protrusion may be directly in communication with one or more power supplies.

Advantageously, the seal or weld that is formed at the protrusion 36 is of sufficient strength, malleability or both such that the first an second tubular members or the like may be later hydroformed. Either the portions of the members 10, 14 including the seal or weld or other portions of the members 10, 14 may be altered or shaped by hydroforming once the seal or welds have been formed.

In a further non-limiting embodiment of the invention, the method of attaching a first tubular member to a second tubular member includes biasing a portion of the protrusion toward the member to which it is being attached and/or biasing the member toward the protrusion. Various methods may be used to bias the protrusion toward the member or the member toward the protrusion. Such methods may use mechanical, magnetic or other force.

Figure 2:
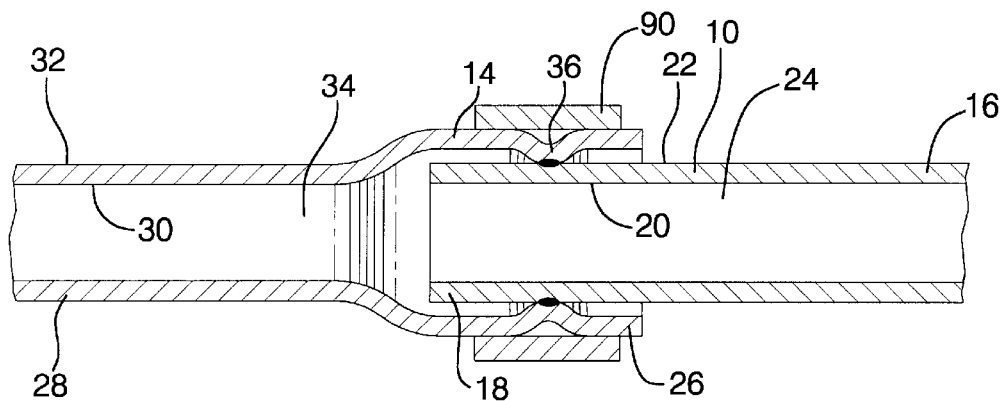
FIG. 2 illustrates a sectional side view of a first tubular member being joined to a second tubular member according to an aspect of the present invention.

Referring to FIG. 2, a clamp 90 (generally conformable to the outer surface of the first or second member 10, 14) is used to bias the protrusion 36 of the second member 14 toward the outer surface 22 of the first member 10. In one embodiment, the clamp 90 is mechanically operated and can be selectively placed to surround the protrusion 36 of the second member 14. The clamp may be adjustable or non-adjustable. In the embodiment shown, where the members 10, 14 have a generally circular cross-section, the clamp 90 is a substantially cylindrical metal member which may be forcibly placed in a position surrounding the protrusion 36 thereby biasing the protrusion of the second member 14 toward the outer surface 22 of the first member 10 and promoting greater contact between the outer surface 22 and the protrusion 36.

In an alternative embodiment, the clamp 90 may be a conformable magnetic member 90 which is placed to surround the protrusion 36. Once in place, a magnetic flux may be induced in the member 90 such that a magnetic field is induced by the member 90 which pushes upon the protrusion 36 effective to bias the protrusion 36 toward the outer surface 22 of the first member 10 and promote greater contact between the protrusion 36 and the first member 10.

In other embodiments, the magnetic member may be in a variety of forms or shapes. For example the magnetic member may be a wire or other metal member which winds the around the protrusion.

In still further embodiments, a magnetic member may be used to form a protrusion in one of the members. For example, the magnetic member 90 may be placed to surround a portion of the first end 26 of the second member 14 and a magnetic field induced by the member 90 could exert sufficient force upon the portion of the first end 26 of the second member 14 to form the protrusion 36.

The person of skill in the art will recognize a variety of manners in which members and/or protrusion can be biased toward each other.

It should be understood that the invention is not limited to the exact embodiment or construction which has been illustrated and described but that various changes may be made without departing from the spirit and the scope of the invention.

What is claimed is:

1. A method for joining a first tubular member, having an end portion with an inner surface and an outer surface, to a second tubular member having an end portion with an inner surface and an outer surface, the end portion of said second tubular member being of a size and shape for receiving, upon insertion, the end portion of said first tubular member such that the outer surface of said first member then is adjacent the full periphery of the inner surface of said second member, said method comprising the steps of:

forming a continuous peripheral protrusion from and around the outer surface of said first tubular member or the inner surface of said second tubular member, said protrusion being directed and sized to engage the adjacent surface of the other of said members upon said insertion;

inserting said end portion of said first tubular member into the end portion of said second tubular member such that the full periphery of said protrusion contacts said adjacent surface;

passing a current through said protrusion effective to form a sealing bond between said protrusion and said adjacent surface; and hydroforming said first and second tubular members including the sealing bond.

2. A method as in claim 1 in which at least one said protrusion is formed generally radially inwardly from the inner surface of said second tubular member.

3. A method as in claim 1 in which at least one said protrusion is formed generally radially outwardly from the outer surface of said first tubular member.

4. A method as in claim 1 further comprising, exerting a force effective to promote contact between said protrusion and said adjacent surface at substantially the same time as said step of passing current through said protrusion.

5. A method as in claim 4, wherein said step of exerting said force includes placing a magnetic member adjacent said protrusion.

6. A method as in claim 1, wherein said step of forming said protrusion includes roll grooving.

7. A method as in claim 1, wherein said step of forming said protrusion includes simultaneously placing an expanding and a reducing force upon said tubular member.

8. A method for joining a first tubular member, having an end portion with an inner surface and an outer surface, to a second tubular member having an end portion with an inner surface and an outer surface, the end portion of the second tubular member being of a size and shape for receiving, upon insertion, the end portion of the first tubular member such that the outer surface of the first member then is adjacent the full periphery of the inner surface of the second member, the method comprising the steps of:

forming a continuous peripheral protrusion from and around the outer surface of the first tubular member or the inner surface of the second tubular member, the protrusion being directed and sized to engage the adjacent surface of the other of the members upon insertion;

inserting the end portion of the first tubular member into the end portion of the second tubular member such that the full periphery of the protrusion contacts the adjacent surface wherein contact of the full periphery with the adjacent surface is the only contact between the first tubular member and the second tubular member;

passing a current from a first electrical connection through the protrusion to a second electrical connection by inducing an electrical potential between the connections wherein the current is effective to form a sealing weld between the protrusion and the adjacent surface; and hydroforming said first and second tubular members including the sealing weld.

9. A method as in claim 8 in which at least one said protrusion is formed generally radially inwardly from the inner surface of the second tubular member prior to the insertion step.

10. A method as in claim 8 in which at lest one said protrusion is formed generally radially outwardly from the outer surface of the first tubular member prior to the insertion step.

11. A method as in claim 8 further comprising exerting a force effective to promote contact between the protrusion and the adjacent surface at substantially the same time as the step of passing a current through the protrusion.

12. A method as in claim 11 wherein the step of exerting the force includes placing a magnetic member adjacent to the protrusion.

13. A method as in claim 8 wherein the step of forming the protrusion includes roll grooving.

14. A method as in claim 8 wherein the step of forming the protrusion includes simultaneously placing an expanding and a reducing force upon the tubular member.

15. A method for joining a first tubular member, having an end portion with an inner surface and an outer surface, to a second tubular member having an end portion with an inner surface and an outer surface, the end portion of the second tubular member being of a size and shape for receiving, upon insertion, the end portion of the first tubular member such that the outer surface of the first member is adjacent the full periphery of the inner surface of the second member, the method comprising the steps of:

forming a continuous peripheral protrusion from and around the outer surface of the first tubular member or the inner surface of the second tubular member, the protrusion being directed and sized to engage the adjacent surface of the other of the members upon insertion;

inserting the end portion of the first tubular member into the end portion of the second tubular after forming the protrusion, thereby contacting the full periphery of the protrusion with the adjacent surface;

biasing the protrusion and the adjacent surface together with a magnetic flux for promoting greater contact between the protrusion and the adjacent surface;

passing a current from a first electrical connection through the protrusion to a second electrical connection by inducing an electrical potential between the connections with a pulsing power supply wherein the current is effective to form a sealing weld between the protrusion and the adjacent surface; and hydroforming the first and second tubular members including the sealing weld to form a component of a space frame of an automotive vehicle.

16. A method as in claim 15 in which at least one said protrusion is formed generally radially inwardly from the inner surface of the second tubular member prior to the insertion step.

17. A method as in claim 15 in which at least one said protrusion is formed generally radially outwardly from the outer surface of the first tubular member prior to the insertion step.

18. A method as in claim 15 further comprising exerting a force effective to promote contact between the protrusion and the adjacent surface at substantially the same time as the step of passing a current through the protrusion.

* * * * *